US008567737B2

(12) United States Patent
Chen

(10) Patent No.: US 8,567,737 B2
(45) Date of Patent: Oct. 29, 2013

(54) CLAMPING DEVICE

(75) Inventor: Chih-Hung Chen, Taipei (TW)

(73) Assignee: Primax Electronics Ltd., Taipei (TW)

( * ) Notice: Subject to any disclaimer, the term of this patent is extended or adjusted under 35 U.S.C. 154(b) by 0 days.

(21) Appl. No.: 13/479,075

(22) Filed: May 23, 2012

(65) Prior Publication Data

US 2013/0206945 A1    Aug. 15, 2013

(30) Foreign Application Priority Data

Feb. 15, 2012    (TW) .............................. 101104896 A

(51) Int. Cl.
A47G 29/00    (2006.01)

(52) U.S. Cl.
USPC .................. 248/316.2; 248/316.6; 248/316.8; 248/313; 379/454

(58) Field of Classification Search
USPC ............. 248/311.2, 315, 316.1, 316.7, 316.8, 248/316.2, 316.6, 346.03; 379/454, 455, 379/426
See application file for complete search history.

(56) References Cited

U.S. PATENT DOCUMENTS

| 5,555,302 | A | * | 9/1996 | Wang ............................. 379/446 |
| 5,694,468 | A | * | 12/1997 | Hsu ............................... 379/446 |
| 5,788,202 | A | * | 8/1998 | Richter ...................... 248/316.4 |
| 5,836,563 | A | * | 11/1998 | Hsin-Yung ................. 248/316.4 |
| 6,285,758 | B1 | * | 9/2001 | Lu ................................. 379/446 |
| 7,272,984 | B2 | * | 9/2007 | Fan .............................. 74/89.17 |
| 7,407,143 | B1 | * | 8/2008 | Chen ......................... 248/309.1 |
| 7,537,190 | B2 | * | 5/2009 | Fan ............................. 248/309.1 |
| 7,967,269 | B2 | * | 6/2011 | Liu ............................. 248/287.1 |
| 2007/0262223 | A1 | * | 11/2007 | Wang et al. .............. 248/346.07 |
| 2009/0294617 | A1 | * | 12/2009 | Stacey et al. ............... 248/316.1 |

* cited by examiner

Primary Examiner — Steven Marsh
(74) Attorney, Agent, or Firm — Kirton McConkie; Evan R. Witt

(57) ABSTRACT

A clamping device is used for clamping an object. The clamping device includes a main body, an actuating mechanism, and two clamping arms. The actuating mechanism is disposed within the main body. The actuating mechanism includes a gear and cam, which are coaxial with each other. Each of the two clamping arms has an extension part. The two extension parts are engaged with two opposite sides of the gear. In a case that the engaging element is engaged with the cam, the two clamping arms are in an open status. In a case that the engaging element is disengaged with the cam, the gear is driven by the cam to be rotated. As the gear is rotated, the two extension parts are towed to be linearly moved. Consequently, the two clamping arms are switched from the open status to a clamping status.

9 Claims, 4 Drawing Sheets

CLAMPING DEVICE

FIELD OF THE INVENTION

The present invention relates to a clamping device, and more particularly to a clamping device for automatically clamping an object after the object is received.

BACKGROUND OF THE INVENTION

With increasing development of science and technology, the functionalities of electronic devices have become more diverse. Since a variety of electronic devices are often used in many occasions of the daily lives, the electronic devices gradually become indispensable tools for many people. In some situations (for example in the case of driving a car), the electronic device is not suitably held or operated by both hands of the user. If the user wants to operate the electronic device or view the newest information shown on the screen of the electronic device while driving a car, a clamping seat is usually employed to facilitate holding the electronic device, so that the electronic device is maintained upright. Under this circumstance, the both hands of the user may be spared to drive the car. If necessary, a single hand of the user may be used to operate the electronic device to the view the newest information.

A way of operating a conventional clamping seat that is commercially available will be illustrated as follows. The conventional clamping seat has two clamping arms. Originally, the clamping arms are in an open status. After a to-be-clamped object is placed within the clamping seat, the two clamping arms may be pushed by a single hand or both hands of the user, so that the two clamping arms are close to each other. Until the to-be-clamped object is securely clamped by the two clamping arms, the clamping action is completed. However, this conventional clamping seat has some drawbacks. For example, if the user wants to complete the clamping action of the conventional clamping seat by a single hand, the force generated by the fingers of the user's palm should be large enough and the length of the user's palm should be long enough. However, the conventional clamping seat is not feasible to the user whose palm is smaller and the finger force is lower. On the other hand, if the user wants to complete the clamping action of the conventional clamping seat by both hands, the two clamping arms should be pushed by the both hands of the user in the directions facing each other. In the case of driving a car or in some situations, the process of performing the clamping action of the conventional clamping seat by both hands is not only troublesome but also detrimental to the safe of the user's life.

Another conventional clamping seat is disclosed in for example Taiwanese Patent No. TW428861. FIG. 1 is a schematic perspective view illustrating a conventional clamping seat disclosed in Taiwanese Patent No. TW428861. As shown in FIG. 1, the conventional clamping seat 7 comprises a linking device 8 and two engaging parts 9. In vies of the benefits, the conventional clamping seat 7 is capable of automatically clamping an electronic device without the need of pressing the two the engaging parts 9 by the both hands of the user. For example, after a specified mode of mobile phone (not shown) is placed on the linking device 8, the specified mode of mobile phone may be automatically clamped by the two engaging parts 9 of the conventional clamping seat 7. That is, when the mobile phone with the specified profile is placed on the linking device 8, the linking device 8 is towed by the gravity of the mobile phone with the specified profile, so that the linking device 8 is moved downwardly. As the linking device 8 is moved downwardly, the two engaging parts 9 of the conventional clamping seat 7 are correspondingly rotated. Consequently, the two engaging parts 9 are just engaged with corresponding recesses (not shown) of the mobile phone with the specified profile. However, the applications of the conventional clamping seat 7 are restricted. That is, the conventional clamping seat 7 may be applied to the mobile phone with the specified profile because the two engaging parts 9 need to be engaged with corresponding recesses of the mobile phone. On the other hand, the mobile phone with other profile is not suitable for the conventional clamping seat 7 because the width of the mobile phone fails to match the width of the conventional clamping seat 7 or the locations of the recesses of the mobile phone fail to match the engaging parts of the conventional clamping seat 7.

Therefore, there is a need of providing a clamping device for clamping an object with any suitable profile. After the object is simply received within the main body of the clamping device, the object can be firmly clamped by the clamping device.

SUMMARY OF THE INVENTION

The present invention provides a clamping device. After an object is received within the clamping device, two clamping arms are actuated to be moved toward the object, thereby clamping the object.

In accordance with an aspect of the present invention, there is provided a clamping device. The clamping device includes a main body, an actuating mechanism, two clamping arms, and an engaging element. The main body has a receiving space. The actuating mechanism is disposed within the receiving space. The actuating mechanism includes a first shaft, a gear, a cam, and an elastic assembly. The gear is disposed on the first shaft. The cam is disposed on the first shaft for driving the gear to be rotated, wherein the cam has a position-limiting part. The gear and the cam are pivotally connected to the main body through the first shaft, and the elastic assembly is contacted with the cam. Each of the clamping arms includes an extension part, and each extension part has a plurality of toothed structures. The toothed structures of the two extension parts are respectively engaged with two opposite sides of the gear, so that the two clamping arms are moved in response to a rotation of the gear. The engaging element is disposed within the receiving space, and includes a second shaft, a first end and a second end. The engaging element is pivotally connected to the main body through the second shaft. The first end of the engaging element is permitted to be engaged with the position-limiting part. In response to a pressing force exerted on the second end of the engaging element, the first end of the engaging element is disengaged from the position-limiting part, so that the cam is pushed by the elastic assembly and the gear is driven by the cam to be rotated. As the gear is rotated, the two extension parts are towed to be moved in opposite directions, so that the two clamping arms are switched from an open status to a clamping status.

In an embodiment, the clamping device further includes a pressing element. The pressing force is exerted on the pressing element. The pressing element is penetrated through a perforation of the main body and sustained against the second end of the engaging element.

In an embodiment, the elastic assembly includes a first elastic element and a frame. The first elastic element has two terminals. The two terminals of the first elastic element are respectively sustained against the main body and the frame.

In an embodiment, the elastic assembly further includes a second elastic element. The first elastic element and the second elastic element are respectively located at two sides of the frame. The first elastic element is a compression spring. The second elastic element is a tension spring. When the first end of the engaging element is engaged with the position-limiting part, both of the compression spring and the tension spring stores elastic potential energy, so that the two clamping arms are in the open status. When the engaging element is disengaged from the position-limiting part, the elastic potential energy stored in both of the compression spring and the tension spring is released, so that the cam is pushed by the elastic assembly to be rotated in a first direction and the two clamping arms are driven by the gear to be in the clamping status.

In an embodiment, the frame has a roller in contact with an outer periphery of the cam. When the cam is pushed by the elastic assembly, the roller is rolled along the outer periphery of the cam.

In an embodiment, the actuating mechanism further includes a long stick, which is connected with the cam.

In an embodiment, the clamping device further includes a reset lever. The reset lever is partially accommodated within the receiving space, and connected with the long stick.

In an embodiment, an end of the long stick is formed as a curvy surface. In addition, the reset lever has a notch for accommodating the end of the long stick.

In an embodiment, the main body further includes a plurality of protrusion structures for confining the reset lever to be moved in an axial direction. When the reset lever is moved in the axial direction in response to a pushing force, the long stick is pushed by the reset lever to be rotated in a second direction opposite to the first direction, so that the engaging element is engaged with the position-limiting part again and the two clamping arms are restored to the open status.

The above objects and advantages of the present invention will become more readily apparent to those ordinarily skilled in the art after reviewing the following detailed description and accompanying drawings, in which:

DETAILED DESCRIPTION OF THE PREFERRED EMBODIMENT

Figure 1:
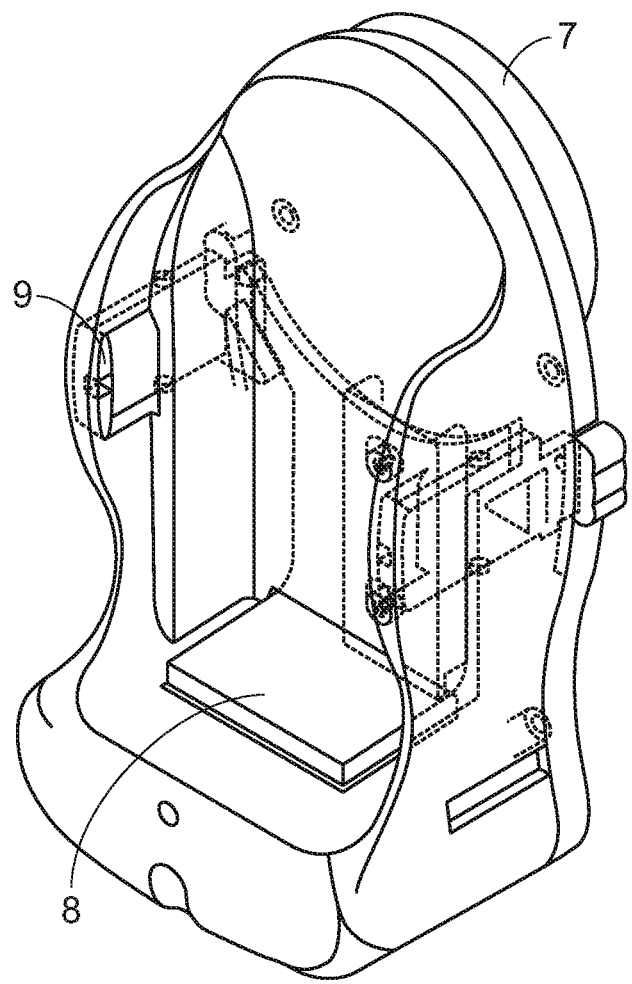
FIG. 1 is a schematic perspective view illustrating a conventional clamping seat.

The present invention will now be described more specifically with reference to the following embodiments. It is to be noted that the following descriptions of preferred embodiments of this invention are presented herein for purpose of illustration and description only. In the following embodiments and drawings, the elements irrelevant to the concepts of the present invention are omitted and not shown. For well understanding the present invention, the elements shown in the drawings are not in scale with the elements of the practical product.

Figure 2:
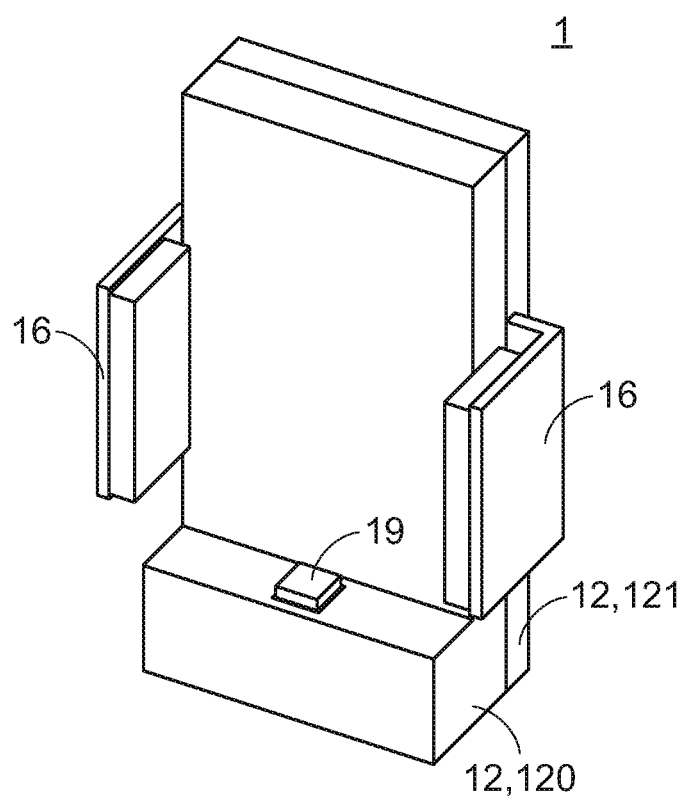
FIG. 2 is a schematic perspective view illustrating a clamping device according to an embodiment of the present invention.
Figure 3:
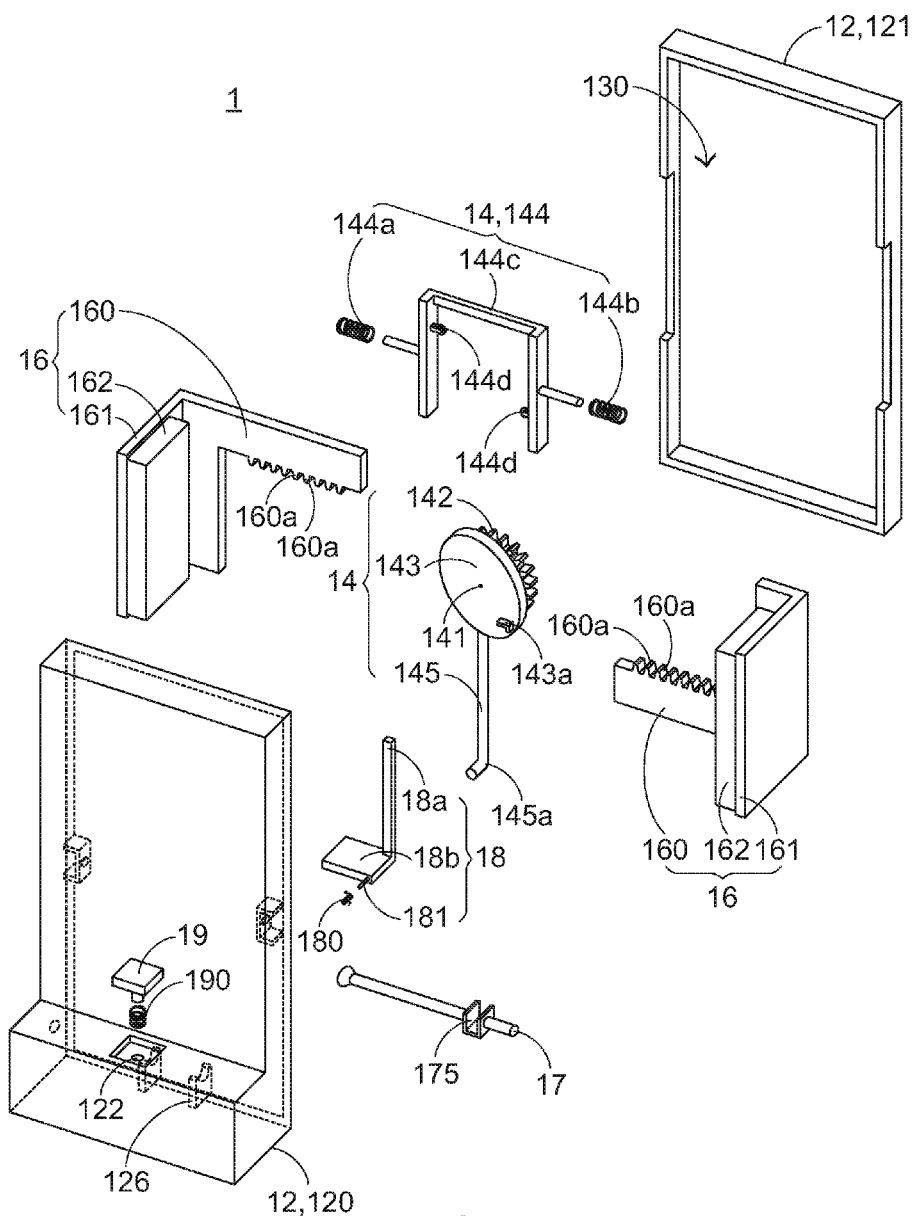
FIG. 3 is a schematic exploded view illustrating the clamping device according to the embodiment of the present invention.

FIG. 2 is a schematic perspective view illustrating a clamping device according to an embodiment of the present invention. FIG. 3 is a schematic exploded view illustrating the clamping device according to the embodiment of the present invention. As shown in FIGS. 2 and 3, the clamping device 1 comprises a main body 12, an actuating mechanism 14, two clamping arms 16, an engaging element 18, and a reset lever 17. In views of assembling convenience, the main body 12 is composed of a front half casing 120 and a rear half casing 121. Consequently, a receiving space 130 is defined by the front half casing 120 and the rear half casing 121 of the main body 12 for allowing the actuating mechanism 14, parts of the clamping arms 16, the engaging element 18 and the reset lever 17 to be received and moved within the main body 12.

In particular, the actuating mechanism 14 comprises a first shaft 141, a cam 143, a gear 142, and an elastic assembly 144. The cam 143 and the gear 142 are pivotally connected to the main body 12 through the first shaft 141. Consequently, the cam 143 and the gear 142 are rotatable relative to the main body 12. Moreover, the cam 143 and the gear 142 are linked with each other. It is preferred that the cam 143 and the gear 142 are connected with each other. In such way, the gear 142 may be rotated with the rotating cam 143, or the cam 143 may be rotated with the rotating gear 142. In addition, a position-limiting part 143a is formed on the cam 143. Preferably, the position-limiting part 143a is protruded from a surface of the cam 143, so that the engaging element 18 may be engaged with the position-limiting part 143a (see FIG. 5).

Please refer to FIGS. 2 and 3 again. The engaging element 18 comprises a second shaft 181, a first end 18a, and a second end 18b opposed to the first end 18a. The engaging element 18 is pivotally connected to the main body 12 through the second shaft 181. Moreover, the second shaft 181 is arranged between the first end 18a and the second end 18b, and served as a fulcrum. The first end 18a of the engaging element 18 may be engaged with the position-limiting part 143a. The second end 18b of the engaging element 18 is a free end. Preferably, the second end 18b is a flat plate, so that an external force may be exerted on the second end 18b. In a case that the second end 18b is pressed down, the first end 18a is correspondingly raised, so that the first end 18a is disengaged from the position-limiting part 143a and the cam 143 is in a disengaged status. In this embodiment, the clamping device 1 further comprises a pressing element 19. The pressing element 19 is penetrated through a perforation 122 of the main body 12 and partially exposed outside the main body 12. In addition, the pressing element 19 is sustained against the second end 18b of the engaging element 18, which is disposed within the receiving space 130. Consequently, the user may press down the pressing element 19 to actuate the engaging element 18. Since the first end 18a is correspondingly raised, the first end 18a is disengaged from the position-limiting part 143a. That is, according to the present invention, it is not necessary to apply an external force on the two clamping arms 16. Instead, the action of clamping the object by the clamping device 1 is actuated when the pressing element 19 is pressed down. Of course, the pressing element 19 may cooperate with a spring 190, and the engaging element 18 may cooperate with an elastomeric element 180. Due to the elastomeric elements 190 and 180, the pressing element 19 and the engaging element 18 may be returned to the original positions after the external force is eliminated. The above configurations of the clamping device 1 are presented herein for purpose of illustration and description only. However, those skilled in the art will readily observe that numerous modifications and alterations of the engaging element 18 may be made while retaining the teachings of the invention. For example, the second end 122 of the engaging element 18 is penetrated through the perforation 122, so that the second end 122 of the engaging element 18 may be directly pressed down by the user.

Figure 4:
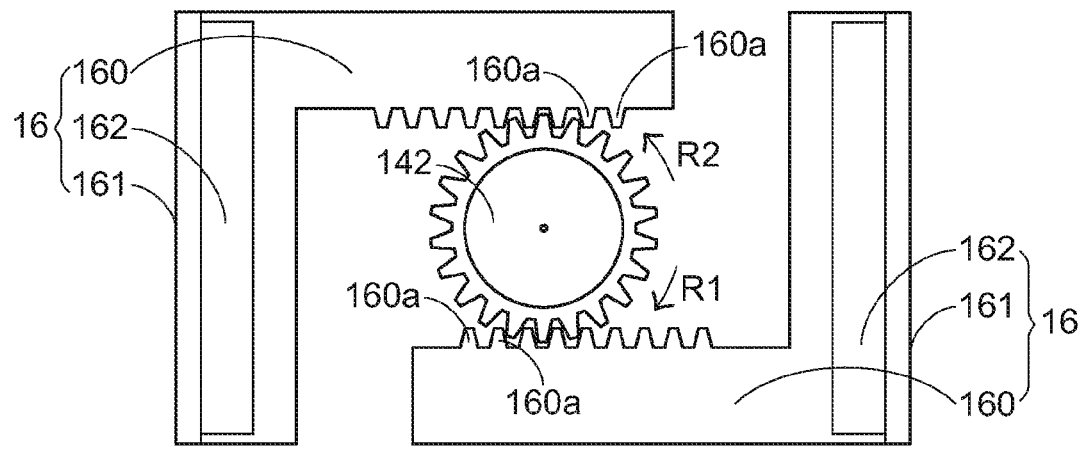
FIG. 4 is a schematic front view illustrating the two clamping arms and the gear of the clamping device according to the embodiment of the present invention.

The operations of the clamping device 1 of the present invention will be illustrated in more details as follows. FIG. 4 is a schematic front view illustrating the two clamping arms 16 and the gear 142 of the clamping device 1 of the present invention. Please refer to FIGS. 2, 3 and 4. Each of the clamping arms 16 comprises an extension part 160 and a clamping block 161. Each extension part 160 has a plurality of toothed structures 160a. The toothed structures 160a of the two extension parts 160 are engaged with two opposite sides of the gear 142, respectively. For example, the toothed structures 160a of the two extension parts 160 are engaged with a top side and a bottom side of the gear 142, respectively. The two clamping blocks 161 are respectively disposed at a left side and a right side of the gear 142 for clamping the object. Moreover, two cushioning pads 162 are arranged between the two clamping blocks 161 and respectively disposed on the two clamping blocks 161 in order to facilitate firmly clamping the object. In this embodiment, the gear 142 is a damping gear for reducing the speed of the clamping device 1 to clamp or liberate the object. As known, a ratchet may be used in a conventional clamping device to perform a clamping action. However, the use of the ratchet may generate annoying cluck noise. In accordance with the present invention, the damping gear is able to quietly actuate the clamping action, thereby providing a comfortable operating environment to the user.

Figure 5:
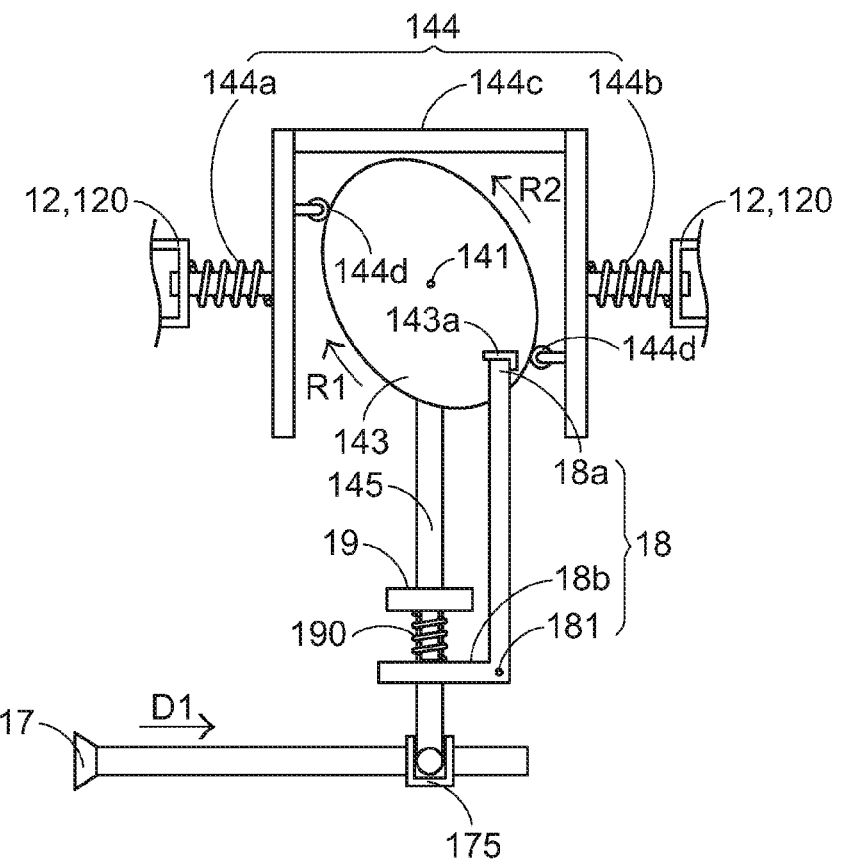
FIG. 5 is a schematic front view illustrating the clamping device according to the embodiment of the present invention.

FIG. 5 is a schematic front view illustrating the clamping device according to the embodiment of the present invention. For clarification and brevity, the front half casing 120 of the main body 12 is not shown in the drawing. Please refer to FIGS. 3, 4 and 5. The elastic assembly 144 comprises a first elastic element 144a, a second elastic element 144b, and a frame 144c. The both terminals of the first elastic element 144a are sustained against the main body 12 (e.g. the front half casing 120 of the main body 12) and the frame 144c, respectively. Similarly, the both terminals of the second elastic element 144b are sustained against the main body 12 (e.g. the front half casing 120 of the main body 12) and the frame 144c, respectively. The frame 144c is contacted with the cam 143. For achieving a more accurate and smoother linking relationship between the frame 144c and the cam 143, the frame 144c has a roller 144d in contact with an outer periphery of the cam 143. In a case that the cam 143 is pushed by the elastic assembly 144, the roller 144d is rolled along the outer periphery of the cam 14. Due to the roller 144d, the friction between the elastic assembly 144 and the cam 143 is largely reduced. Consequently, during the process of clamping or liberating the object by the clamping device 1, the power consumption is reduced and the action is smoother. In this embodiment, the first elastic element 144a is a compression spring, and a second elastic element 144b is a tension spring. The first elastic element 144a and the second elastic element 144b are connected two opposite sides of the frame 144c, respectively. In a case that the first end 18a of the engaging element 18 is engaged with the position-limiting part 143a, the cam 143 and the gear 142 are located at an initial position. In this situation, a pre-force has been exerted on the first elastic element 144a and the second elastic element 144b, so that each of the first elastic element 144a and the second elastic element 144b stores elastic potential energy. In a case that the first end 18a of the engaging element 18 is no longer stopped by the position-limiting part 143a, the elastic potential energy previously stored in the first elastic element 144a and the second elastic element 144b will be released. Consequently, the elastic assembly 144 is horizontally moved to push the cam 143 to be rotated in a first direction R1. Since the gear 142 is linked with the cam 143, the gear 142 is also rotated in the first direction R1. As the gear 142 is rotated in the first direction R1, the two extension parts 160 that are engaged with the gear 142 will be moved internally toward each other. Under this circumstance, the two clamping arm 16 are switched from an open status to a clamping status to clamp the object.

Moreover, the clamping device 1 further comprises a reset lever 17. The rest lever 17 is at least partially accommodated within the receiving space 130. The actuating mechanism 14 further comprises a long stick 145, which is extended from the cam 143. The rest lever 17 is connected with the long stick 145. In a preferable way of connecting the rest lever 17 with the long stick 145, an end of the long stick 145 has a curvy surface 145a, and the reset lever 17 has a notch 175 for accommodating the curvy surface 145a. Due to the curvy surface 145a, the linking relationship between the long stick 145 and the notch 175 becomes smoother. Consequently, in a case that the reset lever 17 is controlled by the user to be moved in an axial direction D1, the cam 143 is linked with the reset lever 17 to be correspondingly rotated. That is, by simply pushing the reset lever 17, the cam 143 may be returned to the original position, so that the engaging element 18 and the position-limiting part 143a are engaged with each other again. Especially, in a case that the reset lever 17 is moved in the axial direction D1 in response to a pushing force, the long stick 145 is pushed by the reset lever 17. Correspondingly, the cam 143 is rotated in a second direction R2 so as to compress the elastic assembly 144, wherein the second direction R2 is opposite to the first direction R1. As a consequence, the elastic assembly 144 is returned to the position where the object has not been clamped. In addition, the elastomeric element 180 may assist in returning the engaging element 18 to the original position, so that the engaging element 18 is engaged with the position-limiting part 143a again. Under this circumstance, the two clamping arms 16 are restored to the open status. Moreover, the main body 12 further comprises a plurality of protrusion structures 126 for confining the reset lever 17 to be moved in the axial direction D1. However, those skilled in the art will readily observe that numerous modifications and alterations of the protrusion structures 126 may be made while retaining the teachings of the invention. For example, the protrusion structures 126 may be replaced by a track.

From the above description, the present invention provides a clamping device. By simply aligning the object with the pressing element and placing the object on the main body, the elaborate cooperation of the cam and the gear may guide the two clamping arms to be moved to the clamping positions to clamp the object. More especially, if the user wants to operate the clamping device to clamp the object, the clamping action may be easily completed without the need of touching the clamping arms of the clamping device or applying a force on the clamping arms of the clamping device. In a case that the user wants to use the clamping device to clamp the object while driving a car, the operating safety is largely enhanced. Moreover, even if the length of the user's palm is small or the force generated by the fingers of the user's palm is small, the clamping device of the present invention is still feasible. In other words, the use of the clamping device of the present invention can enhance the operating flexibility and expand the user groups.

While the invention has been described in terms of what is presently considered to be the most practical and preferred embodiments, it is to be understood that the invention needs not be limited to the disclosed embodiment. On the contrary, it is intended to cover various modifications and similar arrangements included within the spirit and scope of the appended claims which are to be accorded with the broadest interpretation so as to encompass all such modifications and similar structures.

What is claimed is:

1. A clamping device, comprising:
    a main body with a receiving space;
    an actuating mechanism disposed within said receiving space, and comprising:
        a first shaft;
        a gear disposed on said first shaft;
        a cam disposed on said first shaft for driving said gear to be rotated, wherein said cam has a position-limiting part; and
        an elastic assembly, wherein said gear and said cam are pivotally connected to said main body through said first shaft, and said elastic assembly is contacted with said cam;
    two clamping arms, wherein each of said clamping arms comprises an extension part, and each extension part has a plurality of toothed structures, wherein said toothed structures of said two extension parts are respectively engaged with two opposite sides of said gear, so that said two clamping arms are moved in response to a rotation of said gear; and
    an engaging element disposed within said receiving space, and comprising a second shaft, a first end and a second end, wherein said engaging element is pivotally connected to said main body through said second shaft, and said first end of said engaging element is permitted to be engaged with said position-limiting part,
    wherein in response to a pressing force exerted on said second end of said engaging element, said first end of said engaging element is disengaged from said position-limiting part, so that said cam is pushed by said elastic assembly and said gear is driven by said cam to be rotated, wherein as said gear is rotated, said two extension parts are towed to be moved in opposite directions, so that said two clamping arms are switched from an open status to a clamping status.

2. The clamping device according to claim 1, further comprising a pressing element, wherein said pressing force is exerted on said pressing element, and said pressing element is penetrated through a perforation of said main body and sustained against said second end of said engaging element.

3. The clamping device according to claim 2, wherein said elastic assembly comprises a first elastic element and a frame, wherein said first elastic element has two terminals, and said two terminals of said first elastic element are respectively sustained against said main body and said frame.

4. The clamping device according to claim 3, wherein said elastic assembly further comprises a second elastic element, wherein said first elastic element and said second elastic element are respectively located at two sides of said frame, said first elastic element is a compression spring, and said second elastic element is a tension spring, wherein when said first end of said engaging element is engaged with said position-limiting part, both of said compression spring and said tension spring stores elastic potential energy, so that said two clamping arms are in said open status, wherein when said engaging element is disengaged from said position-limiting part, said elastic potential energy stored in both of said compression spring and said tension spring is released, so that said cam is pushed by said elastic assembly to be rotated in a first direction and said two clamping arms are driven by said gear to be in said clamping status.

5. The clamping device according to claim 3, wherein said frame has a roller in contact with an outer periphery of said cam, wherein when said cam is pushed by said elastic assembly, said roller is rolled along said outer periphery of said cam.

6. The clamping device according to claim 1, wherein said actuating mechanism further comprises a long stick, which is connected with said cam.

7. The clamping device according to claim 6, further comprises a reset lever, wherein said reset lever is partially accommodated within said receiving space, and connected with said long stick.

8. The clamping device according to claim 7, wherein an end of said long stick is formed as a curvy surface, and said reset lever has a notch for accommodating said end of said long stick.

9. The clamping device according to claim 8, wherein said main body further comprises a plurality of protrusion structures for confining said reset lever to be moved in an axial direction, wherein when said reset lever is moved in the axial direction in response to a pushing force, said long stick is pushed by said reset lever to be rotated in a second direction opposite to said first direction, so that said engaging element is engaged with said position-limiting part again and said two clamping arms are restored to said open status.

* * * * *